United States Patent [19]

Emoto

[11] Patent Number: 5,025,438
[45] Date of Patent: Jun. 18, 1991

[54] RECORDING AND REPRODUCING OPTICAL INFORMATION DEVICE WHICH CONVERTS THE FIRST BEAM INTO A SECOND BEAM HAVING DIFFERENT LIGHT INTENSITY DISTRIBUTION

[75] Inventor: Masami Emoto, Yokohama, Japan
[73] Assignee: Ricoh Company, Ltd., Tokyo, Japan
[21] Appl. No.: 491,176
[22] Filed: Mar. 9, 1990

[30] Foreign Application Priority Data

Mar. 17, 1989 [JP] Japan ................................. 1-64982

[51] Int. Cl.$^5$ .............................................. G11B 7/00
[52] U.S. Cl. .................................. 369/112; 369/122; 350/170
[58] Field of Search ............... 369/112, 103, 44.23, 369/124, 44.24; 250/201.5; 350/170

[56] References Cited

U.S. PATENT DOCUMENTS

| | | | |
|---|---|---|---|
| 3,736,046 | 5/1973 | Zook | 369/121 |
| 4,110,607 | 8/1978 | Honjo et al. | 369/121 |
| 4,426,696 | 1/1984 | Brendent et al. | 369/112 |
| 4,811,328 | 5/1985 | Ito et al. | 369/112 |
| 4,949,320 | 8/1990 | Furman et al. | 369/121 |

Primary Examiner—Robert L. Richardson
Assistant Examiner—Thang V. Tran
Attorney, Agent, or Firm—Cooper & Dunham

[57] ABSTRACT

An apparatus for recording and reproducing optical information comprises a laser beam source for emitting a laser beam; a collimator lens for forming light emitted from the laser beam source as an approximately parallel light beam; an objective lens for converging the approximately parallel light beam from the collimator lens in the shape of a spot on a recording face of an optical information recording medium; a device for recording and reproducing the optical information by converging the laser beam in the shape of a spot by the objective lens on the recording face of the optical information recording medium; a prism symmetrically arranged with respect to an optical axis in an optical path from the collimator lens to the objective lens; and a device for making a parallel light beam from the collimator lens through the prism incident to the objective lens so as to provide a light intensity distribution in which the light intensity in a peripheral portion of the optical axis is larger than that on the optical axis.

6 Claims, 2 Drawing Sheets

RECORDING AND REPRODUCING OPTICAL INFORMATION DEVICE WHICH CONVERTS THE FIRST BEAM INTO A SECOND BEAM HAVING DIFFERENT LIGHT INTENSITY DISTRIBUTION

BACKGROUND OF THE INVENTION

1. Field of the Invention

The present invention relates to an apparatus for recording and reproducing information with respect to information recording medium such as an optical disk, etc.

2. Description of the Related Art

A general apparatus for recording and reproducing optical information has a laser beam source such as a semiconductor laser, a collimator lens for forming a light beam emitted from the laser beam source as an approximately parallel light beam, and an objective lens for converging the parallel light beam from the collimator lens in the shape of a spot on a recording face of an optical information recording medium such as an optical disk. In this apparatus, the information are recorded and reproduced by converging the laser beam in the shape of a spot on the recording face of the optical information recording medium.

In such an apparatus, to record and reproduce the information of high density, it is sufficient to reduce the distance between tracks of the optical information recording medium and the distance between pits. In this case, it is necessary to reduce the diameter of the light spot converged on the recording face of the optical information recording medium by the objective lens.

The diameter $\phi$ of the light spot is determined by a wavelength $\lambda$ of the laser beam and a numerical aperture NA of the objective lens and is represented as follows.

$$\phi \alpha \lambda / NA$$

Namely, the diameter of the light spot is decreased as the wavelength $\lambda$ of the laser beam is decreased and the numerical aperture NA is increased.

In general, a semiconductor laser (LD) is used as the laser beam source of the apparatus for recording and reproducing optical information. Accordingly, the wavelength $\lambda$ of the laser beam is normally ranged from 780 to 830 nm so that it is impossible to greatly narrow this range.

Further, as the numerical aperture NA of the objective lens is increased, the depth of focus of the objective lens is decreased so that the influence of inclination of the recording face of the optical information recording medium, etc. is increased. Therefore, it is necessary to perform an aligning operation of a focusing position with high accuracy so that there is a fear that the converging degree of the light spot is reduced. Further, when the numerical aperture NA is increased, the number of constructional elements of the lens is increased and cost is increased.

To solve the above problems, for example, in a technique proposed in Japanese Patent Application Laying Open (KOKAI) No. 63-247920, it is possible to form a small light spot by partially interrupting the light beam near an optical axis of the lens even when the light source having the same wavelength $\lambda$ and the objective lens having the numerical aperture NA are used.

However, in such an apparatus, the small light spot cannot be formed without loss of quantity of light emitted from the laser beam source.

SUMMARY OF THE INVENTION

It is therefore an object of the present invention to provide a novel apparatus for recording and reproducing optical information in which a light spot of a small size can be formed without loss of quantity of light emitted from a laser beam source.

The above object of the present invention can be achieved by an apparatus for recording and reproducing optical information comprising a laser beam source for emitting a laser beam; a collimator lens for forming light emitted from the laser beam source as an approximately parallel light beam; an objective lens for converging the approximately parallel light beam from the collimator lens in the shape of a spot on a recording face of an optical information recording medium; means for recording and reproducing the optical information by converging the laser beam in the shape of a spot by the objective lens on the recording face of the optical information recording medium; a prism symmetrically arranged with respect to an optical axis in an optical path from the collimator lens to the objective lens; and means for making a parallel light beam from the collimator lens through the prism incident to the objective lens so as to provide a light intensity distribution in which the light intensity in a peripheral portion of the optical axis is larger than that on the optical axis.

The prism divides the parallel light beam from the collimator lens into a plurality of parallel light beams parallel to the optical axis and having a beam center away from the optical axis, and the divided parallel light beams are emitted to the objective lens. In the light intensity distribution in the optical path until the objective lens, the light intensity in a peripheral portion of the optical axis is larger than that on the optical axis. Therefore, it is possible to reduce the diameter of a light spot without reducing light quantity of the light spot converged by the objective lens.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an apparatus for recording and reproducing optical information in the present invention will next be described in detail with reference to the accompanying drawings.

Figure 1:
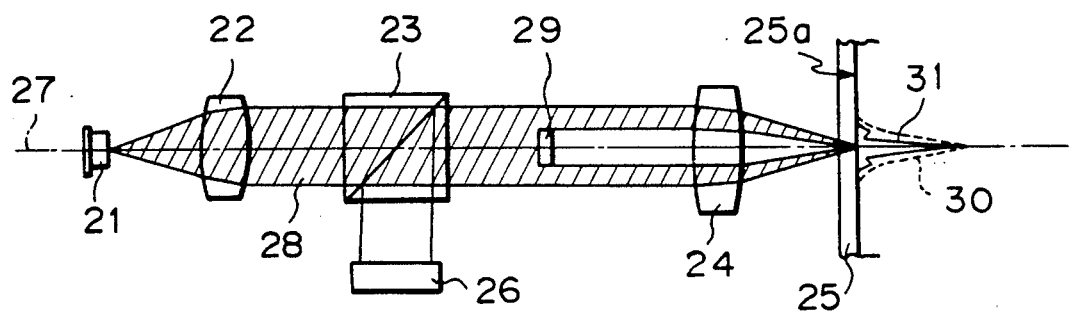
FIG. 1 is a schematic constructional view of an optical system showing one example of a general apparatus for recording and reproducing optical information.

FIG. 1 shows the construction of a general apparatus for recording and reproducing optical information. This apparatus has a laser beam source 21 such as a semiconductor laser, a collimator lens 22 for forming a light beam emitted from the laser beam source 21 as an approximately parallel beam 28, and a light-interrupting plate 29 for partially interrupting a light beam near an optical axis 27 of the collimator lens 22 with respect to the parallel light beam 28 from the collimator lens 22. The above apparatus further comprises an objective lens 24 which converges the light beam partially interrupted by the light-interrupting plate 29 near the optical axis 27 and having a ring shape in the shape of a spot on a recording, face 25a of an optical information recording medium 25 such as an optical disk. The apparatus further comprises a light-receiving element 26 for receiving light reflected from the recording face 25a of the optical information recording medium 25 through the objective lens 24 and a beam splitter 23. In this optical system, the converging characteristics of the light beam are improved by interrupting the light beam near the optical axis 27 by the light-interrupting plate 29 so as to reduce the diameter of the light spot converged by the objective lens 24.

In this apparatus, the light-interrupting plate and the objective lens are integral with each other.

Figure 2:
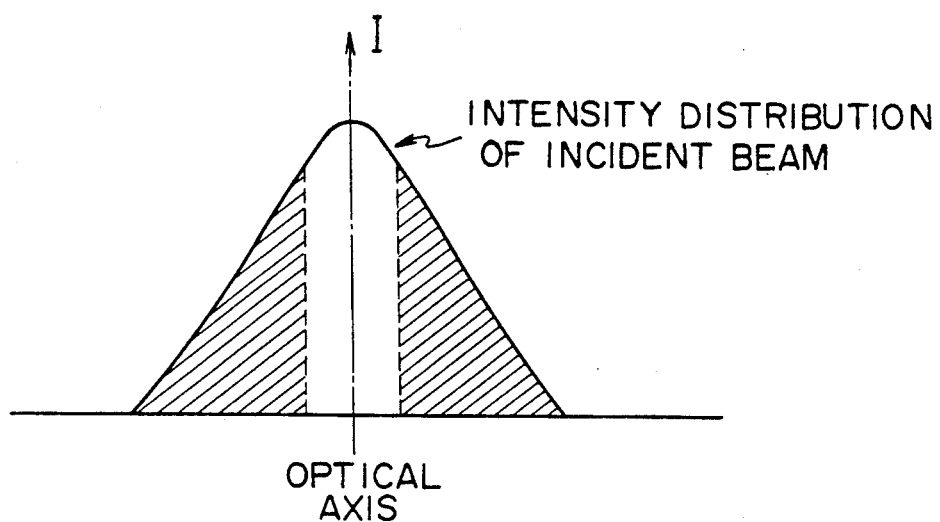
FIG. 2 is a view for explaining the relation between a light intensity distribution of a light beam and an effective utilizing region in the apparatus shown in FIG. 1.

In the system in which the light beam near the optical axis is interrupted by using the light-interrupting plate 29 as shown in FIG. 1, the light beam is interrupted near the optical axis on which the light intensity of the incident light beam formed in the shape of a parallel light beam through the collimator lens 22 is largest. Therefore, as shown in FIG. 2, only hatching portions in a light intensity distribution of the incident light beam are effectively utilized so that the light beam having the strongest light intensity I in a central portion cannot be utilized at all. Therefore, in the apparatus shown in FIG. 1, it is necessary to dispose a light source having a large quantity of light so as to complement loss of light quantity by the light-interruption.

Figure 3:
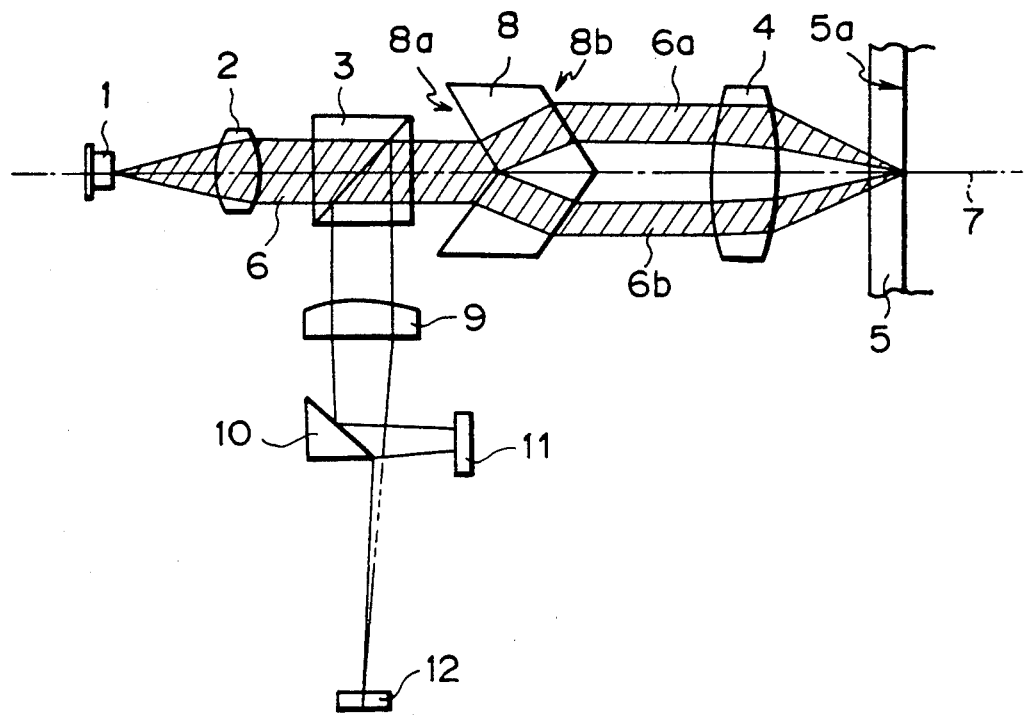
FIG. 3 is a schematic constructional view of an optical system showing an apparatus for recording and reproducing optical information in one embodiment of the present invention.

FIG. 3 is a schematic constructional view of an optical system showing an apparatus for recording and reproducing optical information in one embodiment of the present invention. In this figure, a collimator lens 2 forms a light beam emitted from a semiconductor laser 1 as a laser beam source as a light beam approximately parallel to an optical axis 7. Reference numeral 3 designates a known beam splitter. An objective lens 4 converges the light beam from the collimator lens 2 in the shape of a spot. Reference numerals 5 and 5a respectively designate an optical information recording medium such as an optical disk and an information recording face of the optical information recording medium 5. A prism 8 is arranged to provide an axial symmetry or a rotation symmetry with respect to the optical axis. A converging lens 9 converges light reflected from the recording face 5a of the optical information recording medium 5. A knife edge prism 10 is arranged to detect a signal by a knife edge method. A light-receiving element 11 for detecting a track receives light reflected from the above knife edge prism 10 to provide a tracking signal. A light-receiving element 12 for detecting a focus is composed of two divided light-receiving elements and receives a light beam which is not interrupted by the knife edge prism 10 so as to provide a focusing signal.

In the optical system shown in FIG. 3, the light beam emitted from the semiconductor laser 1 is formed by the collimator lens 2 as an approximately parallel light beam 6 and is then transmitted through the beam splitter 3 to the prism 8.

In the embodiment shown in FIG. 3, the prism 8 has a structure in which two prisms in the shape of a parallelogram having an incident face 8a and a light-emitting face 8b parallel to each other are arranged to provide an axial symmetry (or rotation symmetry) around the optical axis 7. Further, the prism 8 is arranged such that the incident side of the light beam is recessed. Accordingly, the parallel light beam 6 incident to the prism 8 is separated by the action of the prism 8 into two light beams 6a and 6b parallel to the optical axis 7 and are emitted therefrom. Therefore, in a light intensity distribution of the entire light beam emitted from the prism 8, the light intensity in a peripheral portion of the optical axis 7 is larger than that on the optical axis 7. The light beam having such a light intensity distribution is emitted to the objective lens 4 and is converged by the objective lens 4 as a small spot light on the recording face 5a of the optical information recording medium 5.

The light converged by the objective lens 4 on the recording face 5a of the optical information recording medium 5 is reflected on the recording face 5a and is incident to the beam splitter 3 through the objective lens 4 and the prism 8. The light is then reflected by the beam splitter 3 in a direction approximately perpendicular to the optical axis. The light reflected from the beam splitter 3 is formed as a converged light by the converging lens 9. A portion of the light beam is reflected by the knife edge prism 10 and is incident to the light-receiving element 11 for detecting a track, thereby detecting a tracking signal. The light beam, which is not interrupted by the knife edge prism 10, is incident to the light-receiving element 12 for detecting a focus and composed of two divided light-receiving elements, thereby detecting a focusing signal. A sum of the above signals from the light-receiving elements 11 and 12 represents the intensity of the light reflected from the optical information recording medium. A signal indicative of information recorded on the optical information recording medium is detected by the change in light intensity.

As mentioned above, in the optical system shown in FIG. 3, the parallel light beam having the light intensity distribution, in which the light intensity in the peripheral portion of the optical axis 7 is larger than that on the optical axis 7, can be incident to the objective lens 4 by the action of the above prism 8. Accordingly, it is possible to easily form a light spot having a small diameter. Further, since no loss of light quantity is caused in comparison with the case in which the light-interrupting plate is used, it is possible to easily form a small light spot having a large light intensity.

Accordingly, in accordance with the present invention, it is possible to easily improve recording density in the apparatus for recording and reproducing optical information.

In the embodiment shown in FIG. 3, a known knife edge method is used as a signal detecting method. However, the present invention can be similarly applied to an apparatus for recording and reproducing optical information using another signal detecting method.

Figure 4:
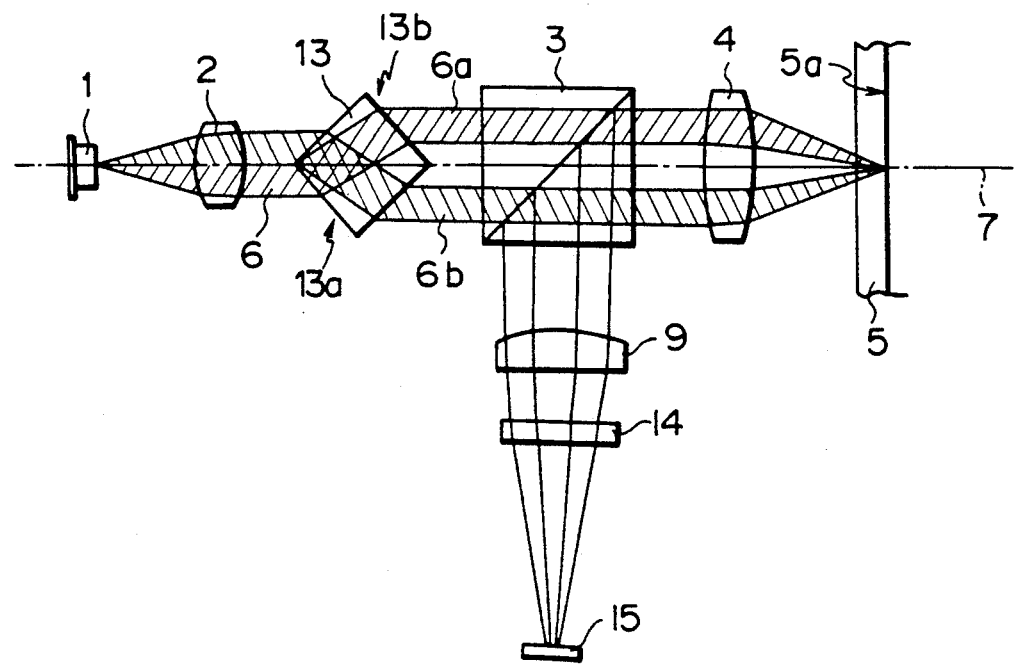
FIG. 4 is a schematic constructional view of an optical system showing an apparatus for recording and reproducing optical information in another embodiment of the present invention.

FIG. 4 is a schematic constructional view of an optical system showing an apparatus for recording and reproducing optical information in another embodiment of the present invention. In this figure, constructional portions similar to those in FIG. 3 are designated by the same reference numerals.

In the optical system shown in FIG. 4, a trigonal prism 13 is arranged to provide an axial symmetry (or rotation symmetry) with respect to an optical axis 7 in an optical path between a collimator lens 2 and a beam splitter 3. Further, an incident face 13a and a light-emitting face 13b of the prism 13 are parallel to each other. In the embodiment shown in FIG. 14, an astigmatic method by a combination of a cylindrical lens 14 and four divided light-receiving elements 15 is used as the signal detecting method.

In the optical system shown in FIG. 4, a light beam emitted from a semiconductor laser 1 is formed by the collimator lens 2 as an approximately parallel light beam 6 and is then incident to the prism 13 symmetrically arranged with respect to the optical axis 7. The light beam incident to the prism 13 is divided into two light beams crossing each other within this prism 13. Then, the two light beams are respectively emitted from the prism 13 in a position away from the optical axis 7 and are transmitted as a light beam parallel to the optical axis 7 through the beam splitter 3 to the objective lens 4.

Thus, the parallel light beam 6 incident to the prism 13 is separated by the action of the prism 13 into two light beams 6a and 6b parallel to the optical axis 7 and are then emitted from the prism 13. Accordingly, with respect to the light intensity distribution of the entire light beam emitted from the prism 13, the light intensity in a peripheral portion of the optical axis 7 is larger than that on the optical axis 7. The light beam having such a light intensity distribution is incident to the objective lens 4 and is converged by the objective lens 4 as a small light spot on a recording face 5a of an optical information recording medium 5.

The light converged by the objective lens 4 on the recording face 5a of the optical information recording medium 5 is reflected on the recording face 5a and is formed as a parallel light beam through the objective lens 4. Thereafter, this light beam is incident to the beam splitter 3 and is reflected by the beam splitter 3 in a direction approximately perpendicular to the optical axis. The light reflected from the beam splitter 3 is formed as a converged light by a converging lens 9 and is incident to the four divided light-receiving elements 15 through the cylindrical lens 14, thereby detecting respective signals by the astigmatic method.

As mentioned above, similar to the optical system shown in FIG. 3, in the optical system shown in FIG. 4, the parallel light beam having a light intensity distribution, in which the light intensity in the peripheral portion of the optical axis 7 is larger than that on the optical axis 7, can be incident to the objective lens 4 by the action of the above prism 13. Accordingly, it is possible to easily form a light spot having a small diameter. Further, since no loss of light quantity is caused in comparison with the case in which the light-interrupting plate is used, it is possible to easily form a small light spot having a large light intensity.

In FIGS. 3 and 4, the incident face and the reflecting face of each of the prisms 8 and 13 are parallel to each other and the light emitted from each prism is a light beam parallel to the optical axis 7. However, the incident face and the reflecting face of each of the prisms 8 and 13 are not necessarily parallel to each other. It is sufficient to set the incident and reflecting faces in a state in which the light can be converged by the objective lens 4 even when the emitted light beam is not parallel to the optical axis 7.

As mentioned above, in accordance with the present invention, the light intensity distribution of a light beam incident to the objective lens can be constructed such that the light intensity in a peripheral portion of the optical axis is larger than that on the optical axis by using a simple construction in which a prism is symmetrically arranged with respect to the optical axis in an optical path of the optical system in the apparatus for recording and reproducing optical information. Accordingly, the converging characteristics by the objective lens can be improved and a small light spot can be easily formed. Further, in the present invention, since the small light spot can be formed without using any light-interrupting plate, no loss of light quantity is caused and the light beam from the light source can be effectively utilized.

Further, in accordance with the present invention, since the incident face and the light-emitting face of the prism mentioned above are set to be parallel to each other, the light beam emitted from the prism can be set to a light beam parallel to the optical axis. Accordingly, it is possible to improve the converging characteristics by the objective lens and easily form a small light spot without changing the layout of the optical system.

Accordingly, in accordance with the present invention, the small light spot can be formed on the recording face of the optical information recording medium without using the objective lens having a large numerical aperture NA and the semiconductor laser having a special short wavelength, thereby improving recording density.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for recording and reproducing optical information, comprising:
    a laser beam source for emitting a laser beam;
    a collimator lens in an optical path of said laser beam for collimating said beam to form a first parallel light beam;
    a prism arranged symmetrically with respect to an optical axis in an optical path of said first parallel light beam for changing said first parallel light beam to a second parallel light beam having a light intensity distribution in which a light intensity at a peripheral portion of said optical axis is greater than that at said optical axis; and
    an objective lens arranged in an optical path of said second parallel light beam for converging said second parallel light beam in the shape of a spot at a recording face of an optical information recording medium.

2. An apparatus according to claim 1, in which said prism diverges said first parallel light beam.

3. An apparatus according to claim 2 in which said prism comprises an incident face and a light-emitting face which are parallel to each other.

4. An apparatus according to claim 1, in which said prism converges said first parallel light beam.

5. An apparatus according to claim 4 in which said prism comprises an incident face and a light-emitting face which are parallel to each other.

6. An apparatus according to claim 1 in which said prism comprises an incident face and a light-emitting face which are parallel to each other.

* * * * *